United States Patent
Yan et al.

(10) Patent No.: US 8,347,071 B2
(45) Date of Patent: Jan. 1, 2013

(54) CONVERTING VIRTUAL DEPLOYMENTS TO PHYSICAL DEPLOYMENTS TO SIMPLIFY MANAGEMENT

(75) Inventors: Peiyuan (George) Yan, Bellevue, WA (US); Olof Mases, Sammamish, WA (US); Larry Steinberg, Sammamish, WA (US); Derick R. Qua, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 226 days.

(21) Appl. No.: 12/702,331

(22) Filed: Feb. 9, 2010

(65) Prior Publication Data

US 2011/0197053 A1 Aug. 11, 2011

(51) Int. Cl.
*G06F 15/177* (2006.01)
(52) U.S. Cl. .................. 713/2; 713/1; 709/221
(58) Field of Classification Search .............. 713/1, 2; 709/221
See application file for complete search history.

(56) References Cited

U.S. PATENT DOCUMENTS

| | | | |
|---|---|---|---|
| 6,317,826 B1 | 11/2001 | McCall et al. | |
| 6,954,852 B2 | 10/2005 | Burokas et al. | |
| 7,353,355 B1* | 4/2008 | Tormasov et al. | 711/165 |
| 7,356,679 B1* | 4/2008 | Le et al. | 713/1 |
| 7,475,282 B2* | 1/2009 | Tormasov et al. | 714/6.3 |
| 7,930,371 B2* | 4/2011 | Furuyama et al. | 709/220 |
| 2006/0143501 A1* | 6/2006 | Tormasov et al. | 714/5 |
| 2008/0028052 A1 | 1/2008 | Currid et al. | |
| 2008/0133902 A1 | 6/2008 | Love | |
| 2008/0294888 A1* | 11/2008 | Ando et al. | 713/2 |
| 2009/0013061 A1 | 1/2009 | Winter et al. | |
| 2009/0049160 A1* | 2/2009 | Cherian et al. | 709/222 |
| 2009/0083404 A1* | 3/2009 | Lenzmeier et al. | 709/221 |
| 2010/0192145 A1* | 7/2010 | Liles et al. | 717/174 |
| 2011/0119382 A1* | 5/2011 | Shaw et al. | 709/226 |

OTHER PUBLICATIONS

"Walkthrough: Deploy a Virtual Hard Disk for Native Boot", Retrieved at<<http://technet.microsoft.com/en-us/library/dd744338(WS.10).aspx>>, May 4, 2009, pp. 4.
Bartholomew, Daniel , "QEMU: A Multihost, Multitarget Emulator", Retrieved at <<http://www.ee.ryerson.ca/~courses/coe518/LinuxJournal/e1j2006-145-QEMU.pdf>>, Jun. 18, 2006, pp. 6.
Penhallurick , Michael A. , "Methodologies for the Use of VMware to Boot Cloned/Mounted Subject Hard Disk Images", Retrieved at<<http://www.sciencedirect.com/science?_ob=ArticleURL&_udi=B7CW4-4HOBT23-1&_user=10&_rdoc=1&_fmt=&_orig=search&_sort=d&_docanchor=&view=c&_searchStrld=1049087976&_rerunOrigin=scholar. google&_acct=C000050221&_version=1&_urlVersion=0&_userid=10 &md5=ddf404a1b67289cb50fc15f8627c3a0c>>.

* cited by examiner

*Primary Examiner* — Chun Cao
(74) *Attorney, Agent, or Firm* — Boswell IP Law; J. Mason Boswell

(57) ABSTRACT

A deployment system allows an administrator to convert virtual deployments to physical deployments so that an administrator can easily move between the virtual and physical world. The deployment system allows an administrator to directly deploy an operating system image in the form of a VHD file to the hard disks of a physical machine as a directly bootable and natively installed operating system. Thus, the deployment system relieves administrators from separately managing physical and virtual deployment images. Instead, administrators can manage only virtual deployment images and convert virtual images to physical deployments as needed.

20 Claims, 4 Drawing Sheets

CONVERTING VIRTUAL DEPLOYMENTS TO PHYSICAL DEPLOYMENTS TO SIMPLIFY MANAGEMENT

BACKGROUND

Large organizations are constantly deploying new computer hardware. For example, a corporation may deploy a new desktop computer system each time an employee is hired and on some regular interval (e.g., every five years) during an employee's employment. Deployment is also common in data centers, where administrators deploy new servers for many reasons, such as to add services, to replace aging hardware, and so forth. Application hosting companies may add servers as user demand increases or as a number of applications hosted increases. Because it is not generally feasible to run an operating system (OS) setup program, which can take many minutes to hours, on each new computer system, it is common in physical machine operating system deployment to deploy a physical image of the operating system to the hard disks of new computer systems. The operating system image may be preconfigured to include common software for the organization, as well as configuration settings (e.g., for security) desired by the organization.

Virtualization refers to the execution of a virtual machine by physical hardware and then running operating systems and/or applications virtually on the virtual machine. The virtual machine may represent a least common denominator of hardware functionality or may represent a well-known configuration for which it is easy to prepare an operating system and applications. Many data centers use virtualization to be able to easily move a virtual machine to new physical hardware as resource requirements increase, for maintenance cycles, and to balance physical server loads. Virtualization is useful for many situations, but can also impose limitations that occur due to many virtual machines contending for the same resources (e.g., central processing unit (CPU), memory, and network interface card (NIC)). Running a virtual machine also typically still entails some initial physical deployment to prepare the physical hardware to run virtual machines.

Although newer operating systems, such as MICROSOFT WINDOWS 7, have added support for booting virtual images natively, system administrators routinely still manage many physical deployments. In addition, although virtualization provides many benefits, it has created a new problem in that administrators have doubled their work by the management of two paradigms. Typically, an administrator chooses at the time of deployment to create either a physical deployment image or a virtual deployment image, and is locked into that choice in the future. Thus, the physical and virtual worlds are two separate configuration options. If it later becomes beneficial to make a different choice, such as moving from physical to virtual to allow easier migration as described above, then the administrator has to build a new virtual image and migrate data from the retiring physical deployment to the new virtual machine. This is both time consuming and redundant.

SUMMARY

A deployment system is described herein that allows an administrator to convert virtual deployments to physical deployments so that an administrator can easily move between the virtual and physical world. This relieves the administrator from being faced with harsh consequences from choosing the wrong type of deployment at the outset, and allows the administrator instead to routinely opt for a virtual image deployment and convert virtual deployments to physical deployments easily when it is useful. The deployment system allows an administrator to directly deploy an operating system image in the form of a VHD file to the hard disks of a physical machine as a directly bootable and natively installed operating system. Thus, the deployment system relieves administrators from separately managing physical and virtual deployment images. Instead, administrators can manage only virtual deployment images and convert virtual images to physical deployments as needed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A deployment system is described herein that allows an administrator to convert virtual deployments to physical deployments so that an administrator can easily move between the virtual and physical world. This relieves the administrator from being faced with harsh consequences from choosing the wrong type of deployment at the outset, and allows the administrator instead to routinely opt for a virtual image deployment and convert virtual deployments to physical deployments easily when it is useful. Virtual machines are typically stored and deployed as Virtual Hard Drive (VHD) files that contain an image of the contents of a virtual machine's stored data. The deployment system allows an administrator to directly deploy an operating system image in the form of a VHD file to the hard disks of a physical machine as a directly bootable and natively installed operating system. The deployment system identifies a target physical machine, receives a VHD file to deploy to the physical machine, extracts the contents of the VHD to a physical storage media of the target physical machine, modifies the extracted contents if needed, and then remaps the extracted contents on the physical hard disk to make the extracted contents bootable as a native operating system. The system is not limited to any one operating system, and administrators can use the system for MICROSOFT WINDOWS, Linux, and other operating system deployments. Thus, the deployment system relieves administrators from separately managing physical and virtual deployment images. Instead, administrators can manage only virtual deployment images and convert virtual images to physical deployments as needed.

VHD is designed to support running virtual machines instead of being used as images for physical machine operating system deployment. However, the deployment system provides a method by which VHD can be used as an operating system image for physical machine operating system deployment. The solution works with multiple operating systems, although the methods used may differ slightly as described further herein. In an operating system deployment scenario the machine on which the operating system is to be deployed is referred to herein as the target machine. Allowing physical deployments from VHDs provides many benefits, including the ability to test an image as a virtual machine before it is deployed physically. Those of ordinary skill in the art will recognize numerous benefits afforded by easy conversion from the virtual domain to the physical domain.

Figure 1:
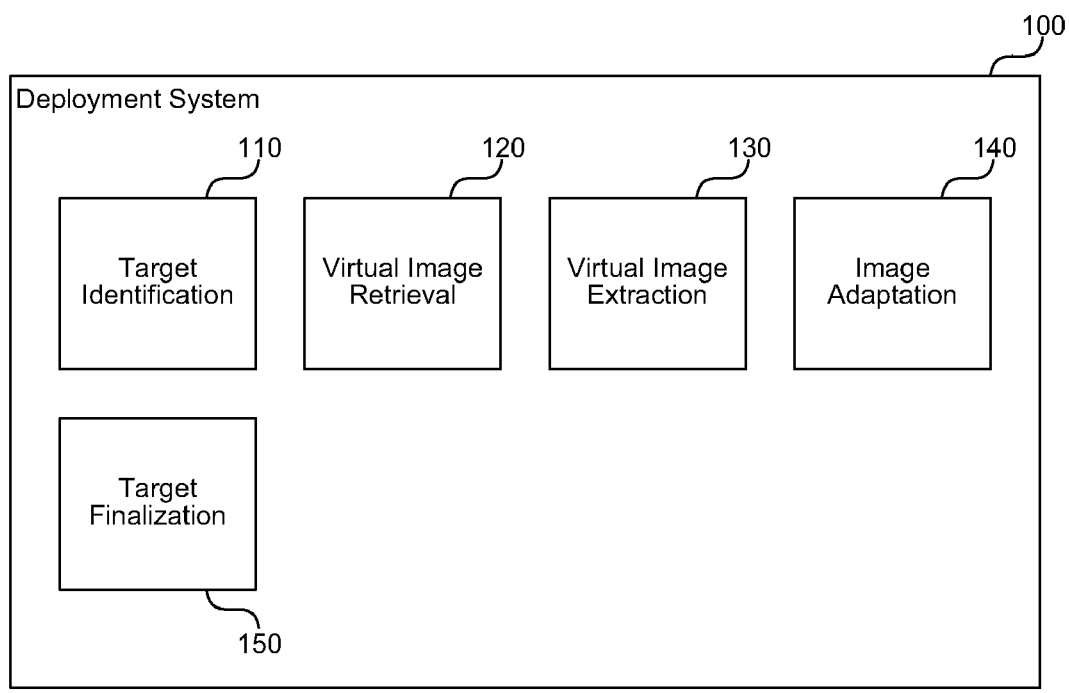
FIG. 1 is a block diagram that illustrates components of the deployment system, in one embodiment.

FIG. 1 is a block diagram that illustrates components of the deployment system, in one embodiment. The system 100 includes a target identification component 110, a virtual image retrieval component 120, a virtual image extraction component 130, an image adaptation component 140, and a target finalization component 150. Each of these components is described in further detail herein.

The target identification component 110 identifies a target physical computer system to which to deploy a virtual operating system image. The target identification component may run as part of an operating system preinstallation environment, such as one booted on the target physical machine using a CD-ROM or other media (e.g., a USB drive). For example, MICROSOFT provides the MICROSOFT WINDOWS Preinstallation Environment (WinPE) that can be combined with the deployment system 100 to perform the steps described herein.

The virtual image retrieval component 120 identifies the virtual operating system image to deploy to the target physical computer. The component 120 may access the image over a network or other media accessible from the preinstallation environment. In some embodiments, the virtual image retrieval component 120 displays a user interface to a system administrator through which the system administrator can navigate to a virtual image stored in a data store and select the virtual image for deployment to the target physical computer. An organization may create a variety of virtual operating system images for deployments to a variety of types of physical hardware and store the images in a centrally accessible location for deployment as needed.

The virtual image extraction component 130 identifies the contents of a virtual operating system image and makes the contents accessible for copying to the physical computer. For example, the virtual operating system image may be mountable as a native file system based on the file system within the virtual operating system image and the types of file systems understood by the preinstallation environment. For example, WINDOWS can mount VHD files containing NTFS file system data natively. For mounted file systems, the component 130 can copy the virtual image data as one or more files. Otherwise, the virtual image extraction component 130 can access the image data as a binary file and can copy the image's contents to the physical computer's hard disk or other storage.

The image adaptation component 140 performs machine-specific adjustments to the virtual operating system image copied to the physical computer. The virtual operating system image may contain configuration settings that are not correct for the physical hardware. For example, the virtual machine for which the virtual operating system image was created may include a different video card or network card than the target physical computer. The image adaptation component 140 may also retrieve drivers specific to the hardware to which the virtual operating system image is being deployed.

The target finalization component 150 prepares the target physical computer to boot into the deployed virtual operating system image. The component 150 may modify the master boot record (MBR) of the target computer to mark the partition on which the deployed operating system is stored as active and may modify boot menu settings of a boot loader to indicate that the deployed operating system is the one to boot by default. This allows the deployment system 100 to reboot the target physical computer system at the end of deployment so that the target system boots into the newly deployed image.

The computing device on which the deployment system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Any computer-readable media claimed herein include only those media falling within statutorily patentable categories, Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
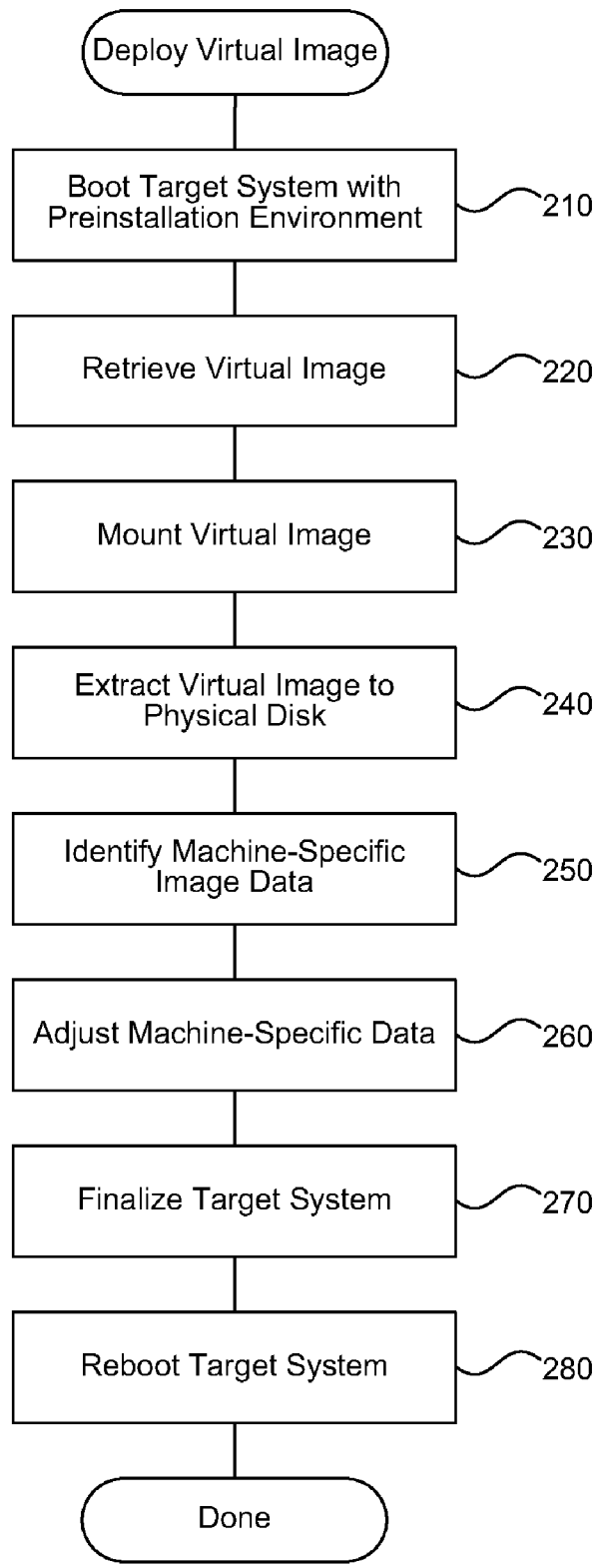
FIG. 2 is a flow diagram that illustrates processing of the deployment system to deploy a virtual image for an operating system for which the virtual image contents are well known, in one embodiment.

FIG. 2 is a flow diagram that illustrates processing of the deployment system to deploy a virtual image for an operating system for which the virtual image contents are well known, in one embodiment. Beginning in block 210, the system boots into a preinstallation environment on a target physical computer. For example, the target physical computer may boot into WinPE from a network or media device attached to the target physical computer. Continuing in block 220, the system retrieves a selected virtual image for deployment to the target physical computer. For example, a VHD that contains the virtual operating system image at this time may be accessible by the target physical computer locally or on the network. In some embodiments, the system deploys two programs to the target machine at this point, named OSDApplyOS.exe and OSDSetupOS.exe. These programs perform the remaining steps on the target system. A different program may be used based on the OS of the virtual image (e.g., vhd2pdWlthUnixFileSystem.exe for UNIX deployments). The deployed programs can interpret the contents within the VHD file.

Continuing in block 230, the system mounts the virtual image so that the virtual image contents are accessible. The contents of the VHD file are then accessible as a collection of WINDOWS or UNIX file system files. For example, the programs installed by the system may be able to use well-known file system application programming interfaces (APIs) within the preinstallation environment to access the VHD contents (rather than the binary method described with reference to FIG. 3). Continuing in block 240, the system extracts the virtual image to the target physical computer's physical data storage (e.g., a hard disk or flash drive). This may include copying files, decompressing compressed data, decrypting encrypted data, and so forth to get the files onto the physical data storage. For example, for a WINDOWS volume, the system copies the collection of files stored in the mounted VHD to a WINDOWS file system volume.

Continuing in block 250, the system identifies machine-specific data stored in the virtual image. The system identifies Information in the VHD that is machine hardware specific, or operating system instance specific, such as drivers, boot configuration, and so forth. For example, the system may be designed with knowledge about where particular operating systems store configuration data (e.g., the Registry of MICROSOFT WINDOWS, or configuration file of UNIX). Continuing in block 260, the system adjusts the identified machine-specific data based on hardware of the target physical computer. The identified machine hardware and operating system instance specific information is modified to match the new hardware and the operating system instance and re-saved to the appropriate WINDOWS or other operating system file system volumes. This may include updating hardware configuration information, modifying operating system activation product keys, and so forth.

Continuing in block 270, the system finalizes the target computer system for booting into the deployed operating system. For example, the system may modify the boot settings of the target physical computer to indicate that the deployed operating system is the one that boots by default. Continuing in block 280, the system reboots the target physical computer, which will then boot into the deployed operating system. The target machine boots into the new operating system and hence completes the operating system deployment process. After block 280, these steps conclude.

Figure 3:
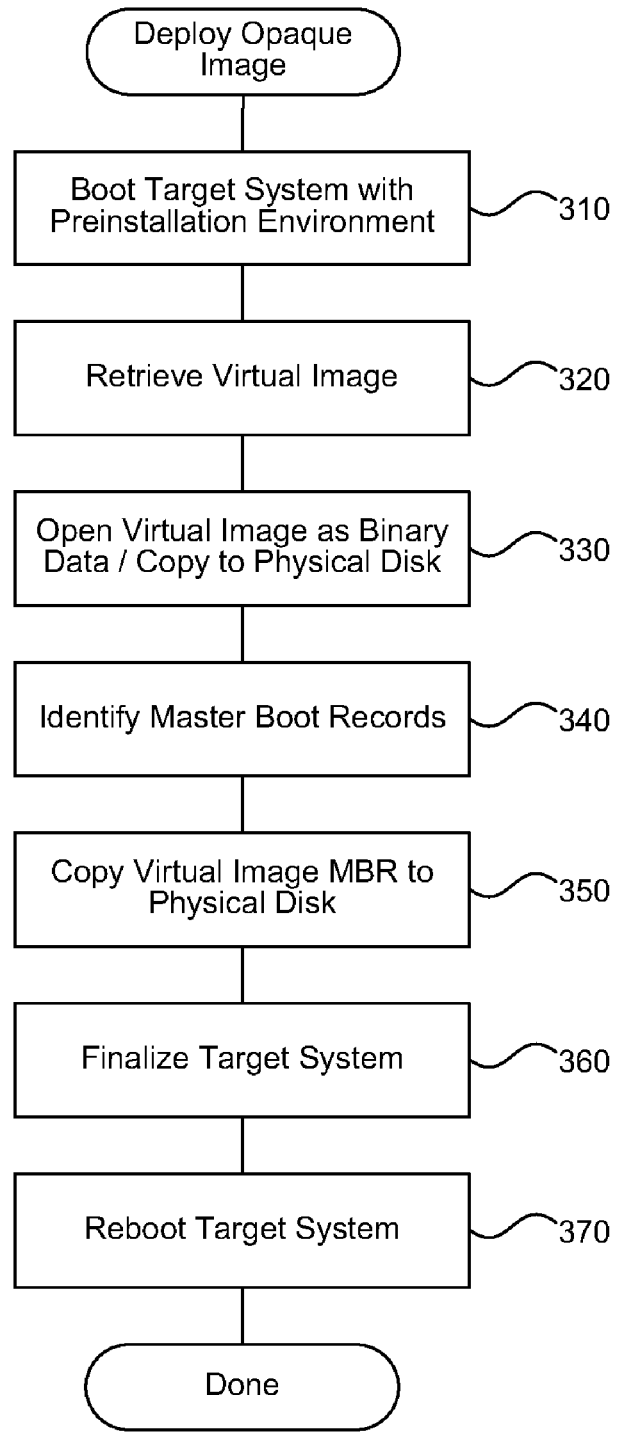
FIG. 3 is a flow diagram that illustrates alternative processing of the deployment system to deploy a virtual image for an operating system for which the virtual image contents are not well known, in one embodiment.

FIG. 3 is a flow diagram that illustrates alternative processing of the deployment system to deploy a virtual image for an operating system for which the virtual image contents are not well known, in one embodiment. The term opaque refers to the fact that the virtual image file contains binary data that the deployment system cannot or does not know how to interpret. In such cases, the deployment system can still deploy the image but the deployment steps vary slightly and the system may not be able to adapt the image in machine-specific ways.

Beginning in block 310, the system boots into a preinstallation environment on a target physical computer. For example, the target physical computer may boot into WinPE from a network or media device attached to the target physical computer. Continuing in block 320, the system retrieves a selected virtual image for deployment to the target physical computer. For example, a VHD that contains the virtual operating system image at this time may be accessible by the target physical computer locally or on the network. In some embodiments, the system deploys a program to the target machine at this point, named vhd2pd.exe that performs the remaining steps on the target system.

Continuing in block 330, the system opens the virtual image as a binary file and block copies the virtual image contents to a data store of the target physical computer. The contents of the VHD, which is the raw image of a storage medium, is deployed directly to the target physical computer (e.g., to a hard disk or flash storage). Note that unlike FIG. 2, the system in this example has less information about what is being copied, but can faithfully copy the VHD contents.

Continuing in block 340, the system identifies the master boot record (MBR) of the virtual image and the MBR of the data store of the target physical computer. The MBR defines how partitions of storage media are used during boot and which partition is the active one to boot by default. The MBR may also invoke a boot loader that displays a boot menu or other pre-operating system software. Continuing in block 350, the system copies the identified virtual image MBR to the identified target physical computer MBR. The system may also realign the binary layout of the VHD content and the physical disk if the MBR of the VHD and that of the physical disk are not in the same location relative to the rest of the binary content.

Continuing in block 360, the system finalizes the target computer system for booting into the deployed operating system. For example, the system may modify the boot settings of the target physical computer to indicate that the deployed operating system is the one that boots by default. Continuing in block 370, the system reboots the target physical computer, which will then boot into the deployed operating system. The target machine boots into the new operating system and hence completes the operating system deployment process. After block 370, these steps conclude.

Figure 4:
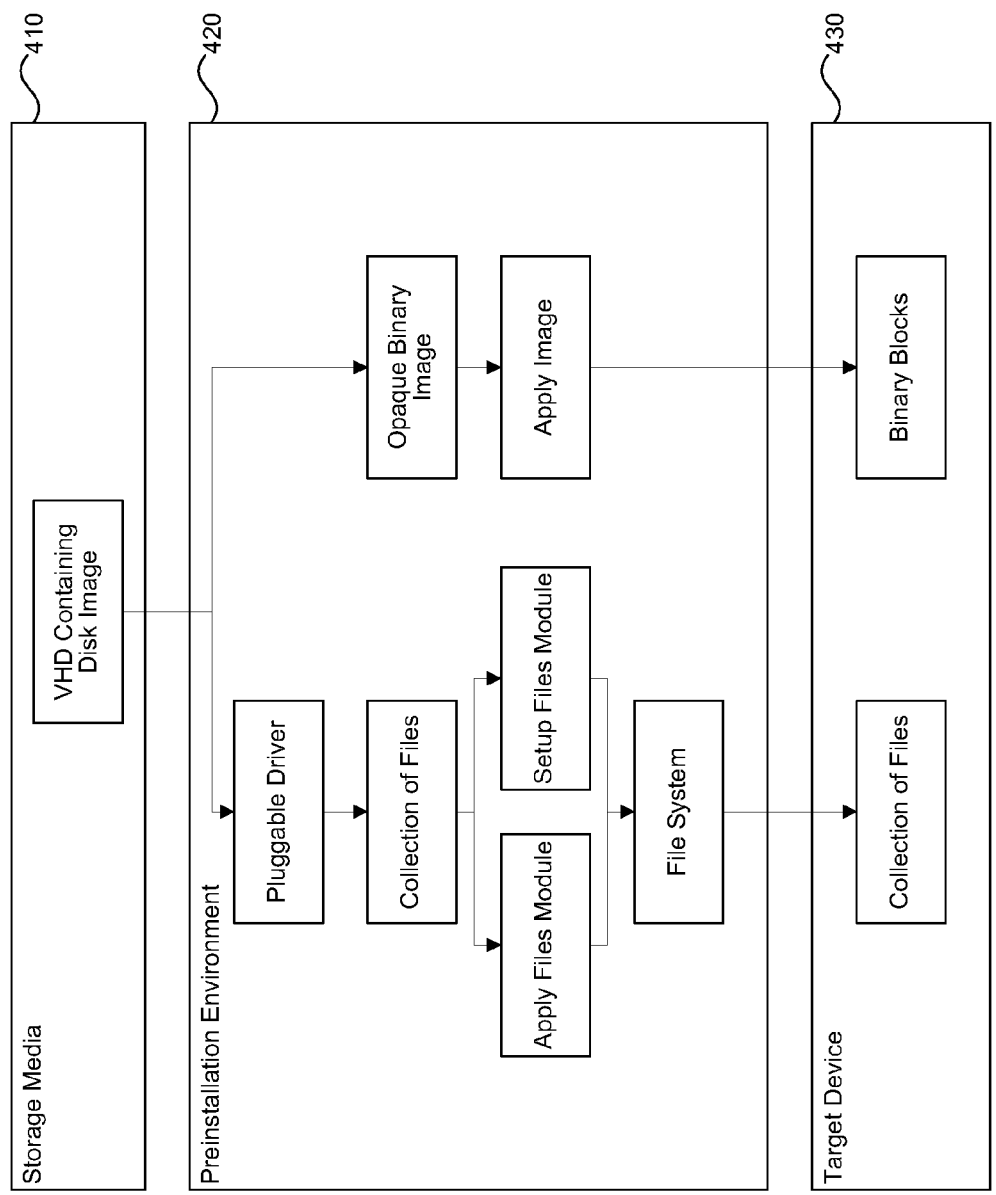
FIG. 4 is a block diagram that illustrates an operating environment of the deployment system, in one embodiment.

FIG. 4 is a block diagram that illustrates an operating environment of the deployment system, in one embodiment. The deployment system uses a network or external media 410 where virtual operating system images are stored. The images may include many types of operating systems stored in many types of file system formats. For example, an image may contain a WINDOWS installation, a Linux installation, or any other type of operating system image, including mobile and embedded operating systems. The deployment system leverages a preinstallation environment 420, such as WinPE, that can be run on a target computer system before any operating system has been installed. The preinstallation environment 420 accesses one or more virtual operating system images stored on the network or external media 410 as a collection of files or as opaque binary data. If the system includes a pluggable driver that can interpret the contents of the image, then the system works with the image as a collection of files, else the system works with the image as binary blocks of opaque data. Programs associated with the system copy the files or data to a target device 430 using file system commands or raw block copying techniques. The target device 430 may include desktop computer systems, server computer systems, mobile devices, embedded devices, and so forth. The virtual operating system image includes a file system containing files, and once copied to the target device 430 that device contains whatever contents were inside the virtual image. The deployment system completes the deployment process by using the preinstallation environment 420 to fix-up any machine-specific or operating system instance-specific data stored on the target device 430 to match the physical hardware of the target computer system. If the system includes a pluggable driver that can interpret the contents of the image, then the fix-up may be more extensive to provide whatever modifications a driver author may want to include.

In some embodiments, the deployment system is used in conjunction with tools for converting a physical deployment to a virtual image. Thus, a system administrator can install an operating system on target hardware, configure the operating system, install various application programs, and then create a virtual image of the physical deployment. This allows the system administrator to only manage stored virtual images (rather than also creating physical images using imaging software like Norton Ghost or Acronis Truelmage). This simplifies the administrator's management tasks while providing a full range of flexibility in how images are created (physically or virtually) and deployed (physically and virtually).

As noted herein, the deployment system is not dependent on any particular operating system or file system to work. The methods described herein can be applied to any operating system and any type of file system data with which an operating system can be deployed. If the operating system runs on the target hardware and can be stored in a virtual image, then the deployment system can deploy the virtual image to physical hardware.

Although described herein for single operating system deployments to a particular target computer, the deployment system can be used to deploy more than one operating system to the same target computer. For example, many operating systems support dual or multi-booting, so that a single hard disk (or several hard disks) of a target computer can contain and boot multiple operating systems. Such systems typically provide a boot menu via a boot loader through which a user can select the operating system to use for any particular boot. In such situations, the system may modify the boot menu to include entries for each operating system deployed to the target computer. For example, this can be useful for test hardware where a particular target computer is used to test application behavior in a variety of operating systems (e.g., MICROSOFT WINDOWS XP, MICROSOFT WINDOWS Vista, and MICROSOFT WINDOWS 7).

From the foregoing, it will be appreciated that specific embodiments of the deployment system have been described herein for purposes of illustration, but that various modifications may be made without deviating from the spirit and scope of the invention. For example, although hard drives, storage media, and hard drive images are described herein, the deployment system is not limited to any one type of data storage hardware. The system can also be used with other current technologies, such as solid-state disk drives, as well as future data storage technologies. Accordingly, the invention is not limited except as by the appended claims.

We claim:

1. A computer-implemented method for deploying a virtual image to a target physical computer, the method comprising:
   booting into a preinstallation environment on the target physical computer;
   retrieving the virtual image for deployment to the target physical computer;
   mounting the virtual image so that the virtual image contents are accessible from the preinstallation environment as a collection of files;
   extracting the virtual image contents to the target physical computer's physical data storage;
   identifying machine-specific data stored in the virtual image;
   adjusting the identified machine-specific data based on hardware of the target physical computer;
   finalizing the target computer system for booting into the deployed operating system; and
   rebooting the target physical computer to complete the deployment, so that the target physical computer boots into the deployed operating system,
   wherein the preceding steps are performed by at least one processor.

2. The method of claim 1 wherein booting into the preinstallation environment comprises booting MICROSOFT WINDOWS Preinstallation Environment (WinPE) from media attached to the target physical computer.

3. The method of claim 1 wherein retrieving the virtual image comprises accessing the virtual image from a network accessible from the preinstallation environment.

4. The method of claim 1 further comprising deploying an operating system specific program for extracting contents of the virtual image and adjusting the machine-specific data, wherein the program can interpret the contents of the virtual image.

5. The method of claim 1 wherein mounting the virtual image comprises invoking an application programming interface of the preinstallation environment to mount the virtual image and access the files contained in the virtual image.

6. The method of claim 1 wherein extracting the virtual image contents comprises at least one of copying, decompressing, and decrypting the virtual image contents.

7. The method of claim 1 wherein identifying machine-specific data comprises identifying information that is hardware or operating system instance specific using knowledge of where particular operating systems store configuration data.

8. The method of claim 1 wherein adjusting the identified machine-specific data comprises modifying the data to match the hardware of the target physical computer and the operating system instance and saving the modifications to an operating system file system volume.

9. The method of claim 1 wherein finalizing the target computer system comprises modifying boot settings of the target physical computer to indicate that the deployed operating system is the one that boots by default.

10. A computer system for deploying a virtual operating system image to a target physical computer, the system comprising:
    a processor and memory configured to execute software instructions;
    a target identification component configured to identify the target physical computer to which to deploy the virtual operating system image;
    a virtual image retrieval component configured to identify the virtual operating system image to deploy to the target physical computer;
    a virtual image extraction component configured to identify contents of the virtual operating system image and make the contents accessible for copying to the target physical computer;
    an image adaptation component configured to perform machine-specific adjustments to the virtual operating system image copied to the target physical computer; and
    a target finalization component configured to prepare the target physical computer to boot into the deployed virtual operating system image.

11. The system of claim 10 wherein the target identification component is further configured to run as part of an operating system preinstallation environment booted on the target physical computer.

12. The system of claim 10 wherein the virtual image retrieval component is further configured to access the virtual operating system image over a network or other media accessible from the preinstallation environment.

13. The system of claim 10 wherein the virtual image retrieval component is further configured to display a user interface to a system administrator through which the system administrator can navigate to a virtual image stored in a data store and select the virtual image for deployment to the target physical computer.

14. The system of claim 10 wherein the virtual image extraction component is further configured to mount the virtual operating system image as a native file system of the preinstallation environment based on the file system within the virtual operating system image and the types of file systems understood by the preinstallation environment.

15. The system of claim 10 wherein the virtual image extraction component is further configured to copy data from the virtual operating system image as one or more files.

16. The system of claim 10 wherein the virtual image extraction component is further configured to copy data from the virtual operating system image as opaque binary data.

17. The system of claim 10 wherein the image adaptation component is further configured to retrieve drivers specific to the hardware of the target physical computer to which the virtual operating system image is being deployed.

18. The system of claim 10 wherein the target finalization component is further configured to modify a master boot record (MBR) of the target physical computer to cause the deployed image to boot by default.

19. A computer-readable storage medium comprising instructions for controlling a computer system to deploy a virtual image to a target physical computer, wherein the instructions, when executed, cause a processor to perform actions comprising:

booting into a preinstallation environment on the target physical computer;

retrieving the virtual image for deployment to the target physical computer;

kmounting the virtual image so that the virtual image contents are accessible frpm the preinstallation environment as a collection of files;

extracting the virtual image contents to the target physical computer's physical data storage;

identifying machine-specific data stored in the virtual image;

adjusting the identified machine-specific data based on hardware of the target physical computer;

finalizing the target computer system for booting into the deployed operating system; and rebooting the target physical computer to complete the deployment, so that the target physical computer boots into the deployed operating system.

20. The medium of claim 19 further comprising, upon detecting that machine-specific data within the virtual image is not in a position relative to the identified virtual image that matches that of a position of the identified physical data store machine-specific data, realigning a binary layout of the virtual image content.

* * * * *